United States Patent [19]

King et al.

[11] Patent Number: 4,645,476
[45] Date of Patent: Feb. 24, 1987

[54] WORK CONVEYOR SPROCKET AND LINK ASSEMBLY

[75] Inventors: Glenn G. King, Greencastle, Pa.; Francis X. Molloy, Hagerstown, Md.

[73] Assignee: Kennecott Corporation, Cleveland, Ohio

[21] Appl. No.: 746,137

[22] Filed: Jun. 18, 1985

[51] Int. Cl.$^4$ ............................................. F16H 7/02
[52] U.S. Cl. ................................... 474/153; 474/206; 198/834
[58] Field of Search ............... 474/153, 149, 157, 206, 474/202; 198/834

[56] References Cited

U.S. PATENT DOCUMENTS 2,897,682  8/1959  Johnson ........................ 474/149 X Primary Examiner—James A. Leppink
Assistant Examiner—Frank H. McKenzie, Jr.
Attorney, Agent, or Firm—Wayne D. Porter, Jr.; Thomas R. Bremer; Burtsell J. Kearns

[57] ABSTRACT

A work conveyor sprocket and link assembly includes a sprocket having a body member. The body member includes a plurality of radially extending teeth connected by arcuate root portions. The body member further includes shoulder portions which extend outwardly from the sides of the body member. The link assembly includes a plurality of individual links connected to each other by link pins. Conveyor slats are secured to one side of the links; small flanges project from the other side of the links. Fasteners are connected to the flanges in order to retain the link pins in place. When assembled, the links engage both the teeth and the shoulder portions so as to distribute applied forces over a large area.

24 Claims, 8 Drawing Figures

WORK CONVEYOR SPROCKET AND LINK ASSEMBLY

BACKGROUND OF THE INVENTION

1. Field of the Invention

The present invention relates to a work conveyor sprocket and link assembly adapted for use in an abrasive environment and, more particularly, to a sprocket and link assembly having increased wear resistance capabilities arising from a configuration which distributes applied forces over a relatively large surface area.

2. Description of the Prior Art

Sprocket and link assemblies typically have a pin and roller arrangement, the rollers being engageable between radially exending teeth of the sprocket. Upon rotation of the sprocket, the teeth of the sprocket apply a force to the rollers and thereby drive the link assembly. In turn, the link assembly can cause the rotation of other sprockets, gears or any suitably configured apparatus which has teeth or some similar force-receiving means to which the now-driven link assembly is engaged. Alternatively, the link assembly can be driven in some manner so that the sprocket is rotated by the link assembly.

Whether the sprocket is the driving member or is itself driven, and whether the product runs in a forward or reverse direction, the sprocket teeth are the conduit for the transmission of force. The teeth typically are small relative to the overall size of the sprocket. Consequently, the amount of applied force can be large in relation to the relatively small surface area provided by the teeth, resulting in high stress concentrations. The resultant highly localized force can cause excessive wear and failure of the sprocket teeth.

The problem of stress concentrations is aggravated when a sprocket and link assembly is used in an abrasive environment. Lubricants, such as oil and the like, cannot be used effectively because lubricants tend to collect and hold abrasive materials in the vicinity of the intermeshing parts. Due to the presence of abrasive materials, excessive wear of the links and the sprocket teeth can occur.

There have been attempts to overcome the various problems associated with sprocket and link assemblies. U.S. Pat. No. 1,218,368 discloses an apparatus for preventing pivots of a drive chain from being forced too deeply into the spaces between the teeth of a sprocket. This reference states that permitting the pivots to deeply engage the spaces between the teeth unnecessarily consumes the transferable driving power and produces an accelerated wear of the working parts. Consequently, circular rims were provided on either side of the teeth to prevent the pivots from entering too deeply into the spaces between the teeth. Unfortunately, this design actually provides less surface area to transmit the applied force because the rims restrict the links to applying the transferred force along a higher, and consequently smaller, portion of the teeth.

U.S. Pat. No. 4,072,062 discloses a self-cleaning sprocket. The sprocket includes teeth-like projections extending outwardly on each side of a sprocket having a smooth-surfaced, disc-like center portion. An elastomeric endless belt having lugs engageable with the teeth is entrained about the sprocket. The combination of the sprocket configuration and the lugs enables the sprocket to be self-cleaning. The desirability of increasing the contact surface area between the lugs and the sprocket is not addressed.

Another sprocket and link assembly especially adapted for use as part of a conveyor in an abrasive environment has been developed by the Pangborn Company of Hagerstown, Md., Model 6GO-3. In this sprocket and link assembly, the sprocket includes eight radially extending teeth connected by flat-bottomed root portions. The sprocket includes a bore through its center with the sprocket being split along the centerline of the bore so that the sprocket can be easily attached to, and removed from, a drive shaft. Sixteen shoulder portions extend outwardly of the sprocket on each side. The shoulder portions extend along the base of the teeth. The links include laterally extending tangs to which slats are secured. The slats cooperate to define a conveyor for supporting workpieces. The links engage the teeth near the flat-bottomed root portions; the links also engage the shoulder portions. Because both the teeth and the shoulder portions are in driving engagement with the links, stress concentrations are reduced. The decrease in stress concentration is sufficiently great that acceptable results have been produced in an abrasive environment.

Although the Model 6GO-3 sprocket and link assembly generally has been satisfactory, certain concerns have not been addressed. One concern relates to the possibility of further increasing the available contact area between the sprocket and the links. An additional concern relates to the manufacturing costs associated with machining shoulder portions on the sprocket. Other concerns relate to the links, particularly to the effort needed to assemble and disassemble the links. The links in the Model 6GO-3 sprocket and link assembly are held together by link pins which themselves are held in place by relatively inaccessible roll pins. Another concern related to the links is the manner in which workpieces are carried by the conveyor. in the Model 6GO-3 sprocket and link assembly, the slats are connected to the links in such a manner that a relatively wide slat gap exists. It would be desirable to provide a conveyor having a reduced slat-to-slat gap.

SUMMARY OF THE INVENTION

The present invention overcomes the aforementioned concerns and provides a new and improved work conveyor sprocket and link assembly. In accordance with the present invention, a sprocket includes a body member having along its outer periphery a plurality of radially extending teeth connected by arcuate root portions. The body member further includes shoulder portions extending outwardly from the sides of the body member adjacent the teeth. The shoulder portions include flat surfaces intersecting at apexes. The apexes are disposed at the center of the teeth. One apex is provided for each tooth. The body member also includes a laterally extending bore which enables the sprocket to be connected to a drive shaft.

The link assembly includes a plurality of links, each having a boss member. A bore extends laterally through the boss member. A pair of spaced arms project from the boss member. The arms include surfaces in force-transmitting engagement with the shoulder portions of the sprocket. The arms terminate in pads which include laterally extending, aligned bores. A tang extends laterally from one of the arms in order to provide an attachment point for a conveyor slat. The tank is located close to the centerline of the bores in the boss member and the pads, and is sloped relative to the centerline such that the gap between adjacent slots is quite small. The other arm includes a pair of laterally extending flanges. The boss member of one link is inserted between the pads of another link and is connected to the other link by a link pin. The link pin is retained in place by a fastener connected between the flanges.

DESCRIPTION OF THE PREFERRED EMBODIMENT

Figure 1:
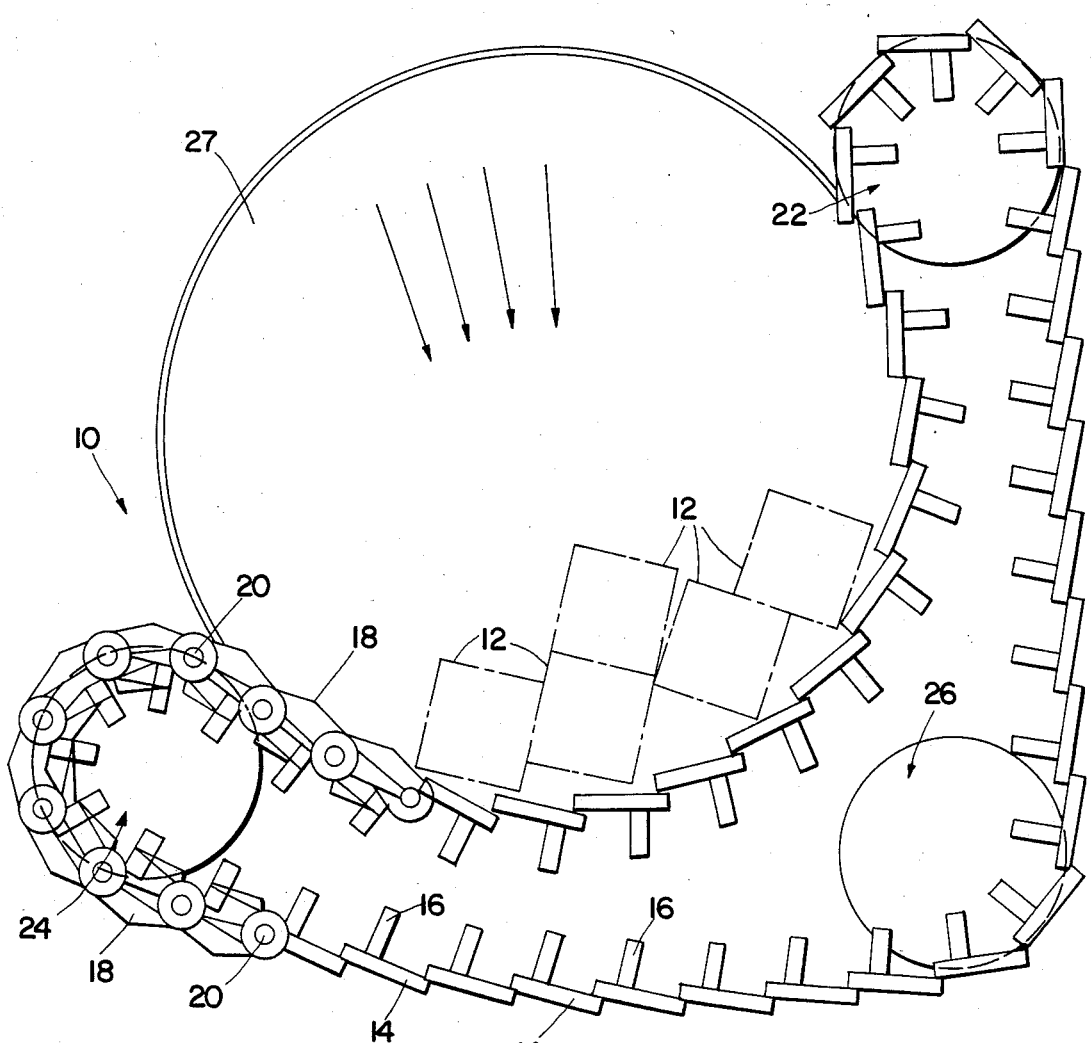
FIG. 1 is a schematic representation of an assembled work conveyor sprocket and link assembly according to the present invention.

Referring to FIG. 1, a work conveyor according to the invention is indicated by the reference numeral 10. The conveyor 10 is adapted to move workpieces 12 in the path of streams of high speed abrasive particles in order to clean the workpieces 12. The workpieces 12 are indicated schematically and can take the form of such objects as automobile miscellaneous castings, and the like.

The conveyor 10 includes a plurality of slats 14 supported by reinforcing members 16 secured to the back side of the slats 14. The slats 14 are connected at their ends to links 18. The links 18 are connected to each other by link pins 20. The connected links 28 form a so-called link assembly. The assembled links 18 are reeved about a drive sprocket 22, an idler roller 24, and a take-up roller 26. Circular plates 27 (only one of which is shown in FIG. 1) are disposed at the ends of the slats 14 and create, in effect, a chamber within which the workpieces 12 can be tumbled and cleaned.

When cleaning workpieces 12 such as miscellaneous castings, the individual components of the conveyor 10 are quite large and durable. For example, the slats 14 can be manufactured from manganese steel and can be on the order of 1½ inches thick, 9 inches wide, and 7 to 11 feet long. The links 18 can have a pitch of 5½ inches, and the link pins 20 can have a diameter of 1¼ inches. The various components such as the links 18 and the sprocket 22 can be heat treated to enhance their resistance to wear.

Figure 2:
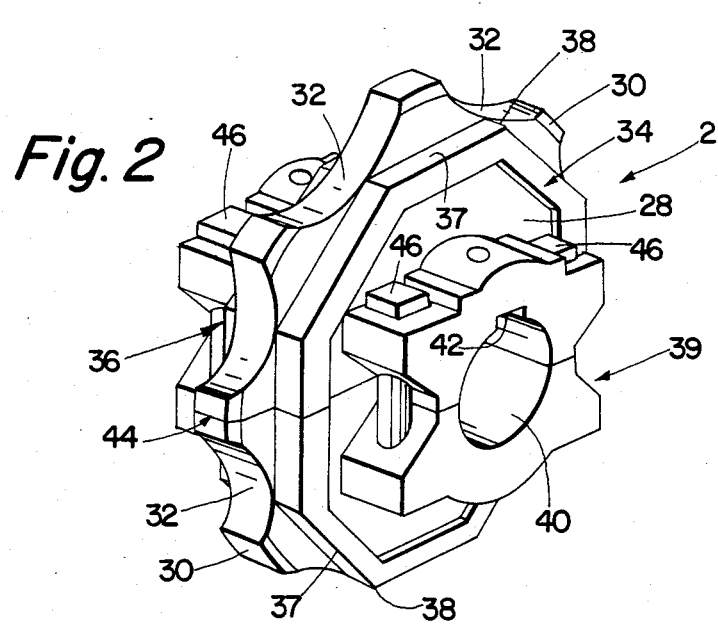
FIG. 2 is a perspective view of one of the sprockets of FIG. 1.
Figure 3:
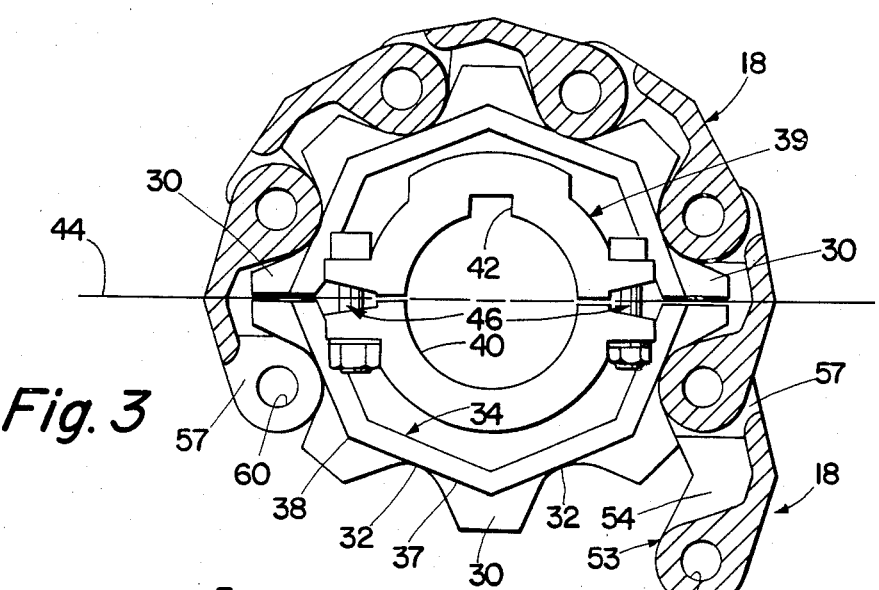
FIG. 3 is a side elevational view of one of the sprockets and a portion of a link assembly of FIG. 1.

The drive sprocket 22 is illustrated in more detail in FIGS. 2 and 3. The sprocket 22 includes a disc-like body member 28 from which a plurality of teeth 30 project. The teeth are interconnected by arcuate root portions 32. Preferably, eight teeth 30 and eight root portions 32 are provided. Shoulder portions 34 extend outwardly from one side of the body member 28 adjacent the root portions 32. Similarly, shoulder portions 36 extend outwardly from the other side of the body member 28. Each shoulder portion 34, 36 includes flat surfaces 37 and apexes 38. The flat surfaces 37 are disposed tangent to the arcuate root portions 32, while the apexes 38 are disposed at the center of the teeth 30. One apex 38 is provided for each tooth 30.

A drive hub 39 extends outwardly from each side of the body member 28. A bore 40 extends through the drive hubs 39 and the body member 28. The bore 40 is adapted to be fitted over a drive shaft (not shown). The sprocket 22 is fixed relative to the drive shaft by means of a key (not shown) fitted into a keyway 42 formed in a sidewall of the bore 40. The sprocket 22 preferably is formed in a casting operation from alloy steel and subsequently is cut into two pieces about a plane indicated by line 44. In the embodiment illustrated, the plane 44 passes through the center of opposed teeth 30, the apexes 38 of opposed shoulder portions 34, 36, and the centerline of the bore 40. Bolted fasteners 46 are provided to secure the two sprocket halves together about the drive shaft.

Referring to FIGS. 3–8, the links 18 are illustrated in more detail. Each link 18 is formed integrally in a casting operation and includes a cylindrical boss member 50 having a bore 52 extending laterally through the boss member 50. Each boss member 50 includes a sprocket-contacting portion 53. Spaced arms 54, 56 project from the boss member 50. The arm 54 terminates in a first pad 57 and the arm 56 terminates in a second pad 58. The pads 57, 58 are approximately parallel to each other and are disposed approximately perpendicular to the longitudinal axis of the bore 52. The boss member 50, the arms 54, 56, and the pads 57, 58 cooperate to form a clevis-like construction. The space between the pads 57, 58 is equal to, or slightly greater than, the width of the boss member 50. The pads 57, 58 include laterally extending, aligned bores 60, 62, respectively. The edges of the arms 54, 56 disposed adjacent the sprocket-contacting portion 53 include sloped portions 64, 66 which intersect with each other at an angle A equal to the angle of intersection of the flat surface 37 and the apexes 38. In the embodiment illustrated, angle A is 135 degrees.

Figure 4:
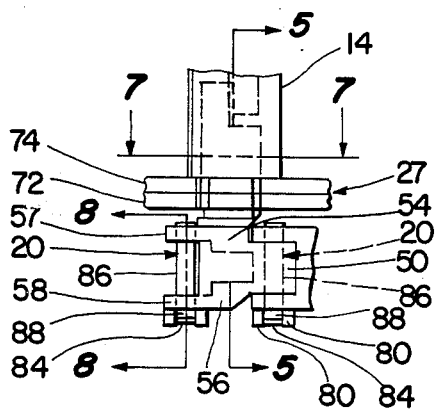
FIG. 4 is a plan view of a link and a portion of a conveyor slat from FIG. 1.
Figure 5:
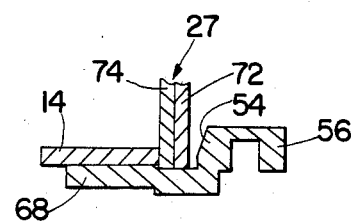
FIG. 5 is a cross-sectional view of the link and conveyor slat of FIG. 4 taken along a plane indicated by line 5—5 in FIG. 4.

Referring particularly to FIGS. 4 and 5, a tang 68 projects laterally from the arm 54. A plurality of openings 70 are provided in the tang 68 in order to attach the slat 12 to the link 18. Fasteners (not shown) extend through the openings 70 for this purpose. The space between the end of the slat 12 and the arm 54 is great enough to accommodate two circular plates 27, one denominated head plate 72 and the other wear plate 74.

Figure 7:
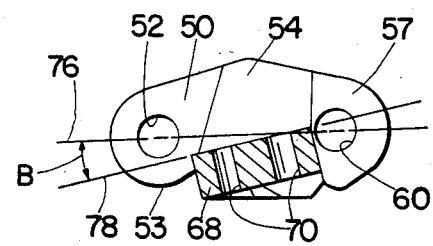
FIG. 7 is a cross-sectional view of the link of FIG. 4 taken along a plane indicated by line 7—7 in FIG. 4.

Referring particularly to FIG. 7, the centerline of the bores 52, 60, 62 is indicated by a line 76. A plane coincident with the mounting surface of the tang 68 is indicated by a line 78. Because the underside of the slat 14 rests atop the tang 68, the link-to-slat interface is close to the pivot pin centerline 76. The angular difference between the centerline 76 and the plane 78 is indicated by the angle B in FIG. 7. In the embodiment illustrated, angle B is approximately 12 degrees and, most desirably, 11 degrees, 40 minutes.

Figure 6:
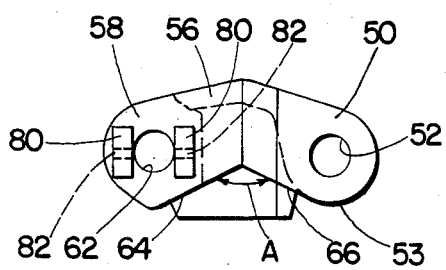
FIG. 6 is a side elevational view of the link of FIG. 4.
Figure 8:
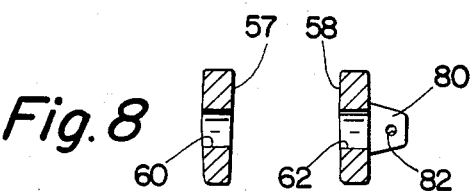
FIG. 8 is a cross-sectional view of a portion of the link of FIG. 4 taken along a plane indicated by line 8—8 in FIG. 4.

Referring to FIGS. 4, 6 and 8, a pair of small flanges 80 project from the pad 56. The flanges 80 straddle the bore 62. The flanges 80 include longitudinally extending, aligned openings 82. A fastener 84 such as a roll pin is adapted to be fitted into the aligned openings 82.

Referring to FIG. 4, the link pins 20 each include a shaft 86 having an enlarged, flat-sided head 88. The shaft 86 is adapted to be fitted tightly within the bores 52, 60, 62, while the head 88 is adapted to be fitted between the flanges 80.

ASSEMBLY AND OPERATION

In order to assemble the links 18, the boss member 50 of a given link 18 is inserted between the spaced pads 57, 58 of another link 18. Upon aligning the bores 52, 60, 62 and inserting the shaft 86 of a link pad 20 through the aligned openings, the links 18 will be connected. Upon inserting the fasteners 84 into the aligned opening 82, the link pins 20 will be retained in place.

The slats 14 then can be connected at each end to the tangs 68. Upon passing the assembled links about the sprockets 22, 24, 26, the slats 14 will be supported at each end and will form a conveyor surface.

In operation, upon rotating the drive sprocket 22 in a clockwise direction as viewed in FIG. 1, workpieces 12 supported by the slats 14 will be tumbled. All surfaces of the workpiece 12 will be exposed for impingement by abrasive particles. During clockwise, or forward, rotation of the sprocket 22, the sprocket-contacting portions 53 of the boss members 50 will engage the arcuate root portions 32 and the sloped portions 66 of the arms 54, 56 will engage the flat surfaces 37 near the apexes 38. The arcuate root portions 32 provide more contact area than the flat root portions of prior sprocket constructions. The shoulder portions 34, 36 are quite large and provide more link-to-sprocket contact area than in prior constructions in which smaller shoulder portions have been provided. In the embodiment illustrated, the contact area between the sloped portions 66 and the flat surfaces 37 is approximately 2.175 square inches, a considerable improvement over the 6GO-3 sprocket-link construction in which the contact area was approximately 1.148 square inches. The large surface area contacted by the intermeshing parts insures that stress concentrations are reduced.

After the workpieces 12 have been cleaned, they can be removed from the conveyor 10 by reversing the direction of rotation of the drive sprocket 22. Although the conveyor 10 is operated in a reverse direction for a shorter period of time than in a forward direction and under less abrasive conditions, the increased contact area occasioned by the shoulder portions 32, 34 and the sloped portions 64 of the arms 56, 58 helps to insure a longer service life.

Compared with the cost of manufacturing prior spockets having machined shoulder portions, the sprocket 22, according to the invention can be manufactured less expensively because it is formed in a casting operation. Further, the ease of assembly and disassembly of the links 18 is enhanced because the fasteners 84 are disposed on the exposed side of the links 18. The close positioning of the upper surface of the tang 68 and the centerline of the bores 52, 60, 62, coupled with their relatively small angular relationship, provdes that a small slat-to-slat gap will be maintained under all operating conditions.

Although the invention has been described in its preferred form with a certain degree of particularity, it will be appreciated from the foregoing description that various changes in the details of construction and arrangment of components can be resorted to without departing from the true spirit and scope of the invention as hereinafter claimed. It is intended that the patent shall cover, by suitable expression in the appended claims, whatever degree of patentable novelty exists in the invention disclosed.

What is claimed is:

1. A sprocket, comprising:
   a disc-like body member having opposed sides and a plurality of radially extending teeth connected by arcuate root portions; and
   shoulder portions projecting from each side of the body member, the shoulder portions being disposed adjacent the teeth, the shoulder portions including flat surfaces intersecting at apexes, the apexes being disposed at the center of the teeth and the flat surfaces being disposed adjacent the tangent of the arcuate root portions, one apex being provided for each tooth.

2. The sprocket of claim 1, wherein eight teeth are provided.

3. The sprocket of claim 1, wherein the body member, the teeth, and the shoulder portions are formed integrally in a casting operation.

4. The sprocket of claim 1, further comprising a drive hub projecting laterally from the body member, the drive hub and the body member including a laterally extending bore.

5. The sprocket of claim 4, wherein the sprocket is divided into halves along a plane passing through two opposed teeth, two opposed apexes, and the centerline of the bore.

6. A link, comprising:
   a boss member having a laterally extending bore;
   spaced arms projecting from the boss member, the arms terminating in a pair of spaced pads, the spaced pads having aligned bores, the aligned bores having a longitudinal axis parallel to the longitudinal axis of the bore in the boss member, the pads being spaced a distance equal to, or greater than, the widht of the boss member; and
   a tang extending laterally from one of the arms, the tang having a generally flat mounting surface, the mounting surface lying in a plane positioned adjacent a line connecting the centerline of the bore in the boss member and the aligned bores in the pads.

7. The link of claim 6, wherein the angle between the plane of the mounting surface and the centerline of the bores is on the order of 12 degrees.

8. The link of claim 7, wherein the angle between the plane of the mounting surface and the centerline is 11 degrees, 40 minutes.

9. The link of claim 6, wherein the boss member includes a sprocket-contacting portion and the edges of the spaced arms adjacent the sprocket-contacting portion include sloped portions intersecting at a predetermined angle.

10. The link of claim 9, wherein the predetermined angle is 135 degrees.

11. The link of claim 6, further comprising flanges extending outwardly of the pad of the non-tang-carrying arm, the flanges being disposed on opposite sides of the bore in the pad.

12. The link of claim 11, wherein the flanges include openings adapted to receive a fastener.

13. The link of claim 6, wherein the pads are generally parallel with each other and are generally perpendicular to the longitudinal axis of the bore in the boss member.

14. The link of claim 6, wherein the boss member, the arms, and the tang are formed integrally in a casting operation.

15. A sprocket and link assembly, comprising:

a sprocket, the sprocket including a body member having a plurality of radially extending teeth connected by arcuate root portions, shoulder portions projecting from each side of the body member, the shoulder portions being disposed adjacent the teeth, the shoulder portions including flat surfaces intersecting at apexes, the apexes being disposed at the center of the teeth and the flat surfaces being disposed adjacent the tangent of the arcuate root portions, one apex being provided for each tooth; and a plurality of links adapted to engage the sprocket in force-transmitting relationship, each link including a boss member having a laterally extending bore, spaced arms projecting from the boss member, the arms terminating in a pair of spaced pads, the spaced pads having aligned bores, the aligned bores having a longitudinal axis parallel to the longitudinal axis of the bore in the boss member, the pads being spaced a distance equal to, or greater than, the width of the boss member, the boss member including a sprocket-contacting portion and the edges of the spaced arms adjacent the sprocket-contacting portion including sloped portions contacting the shoulder portions, the sloped portions intersecting at an angle equal to the angle of intersection of the flat surfaces of the shoulder portions.

16. The sprocket and link assembly of claim 15, wherein eight teeth are provided.

17. The sprocket and link assembly of claim 15, wherein the sprocket and the links are formed in casting operations.

18. The sprocket and link assembly of claim 15, further comprising a tang extending laterally from one of the arms, the tang having a generally flat mounting surface, the mounting surface lying in a plane positioned adjacent a line connecting the centerline of the bore in the boss member and the aligned bores in the pads.

19. The sprocket and link assembly of claim 18, wherein the angle between the plane of the mounting surface and the centerline is 11 degrees, 40 minutes.

20. The sprocket and link assembly of claim 15, further comprising flanges extending outwardly of the pad of the non-tang-carrying arm, the flanges being disposed on opposite sides of the bore in the pad.

21. The sprocket and link assembly of claim 20, wherein the flanges include openings adapted to receive a fastener.

22. The sprocket and link assembly of claim 21, further comprising a link pin fitted into the bore in the boss member and the aligned bores in the spaced pads to as to hold adjacent links together, the pin being held in place by a fastener disposed in the openings in the flanges.

23. The sprocket and link assembly of claim 15, further comprising a drive hub projecting laterally from the body member, the drive hub and the body member including a laterally extending bore.

24. The sprocket and link assembly of claim 23, wherein the sprocket is divided into halves along a plane passing through two opposed teeth, two opposed apexes, and the centerline of the bore.

* * * * *